UNITED STATES PATENT OFFICE.

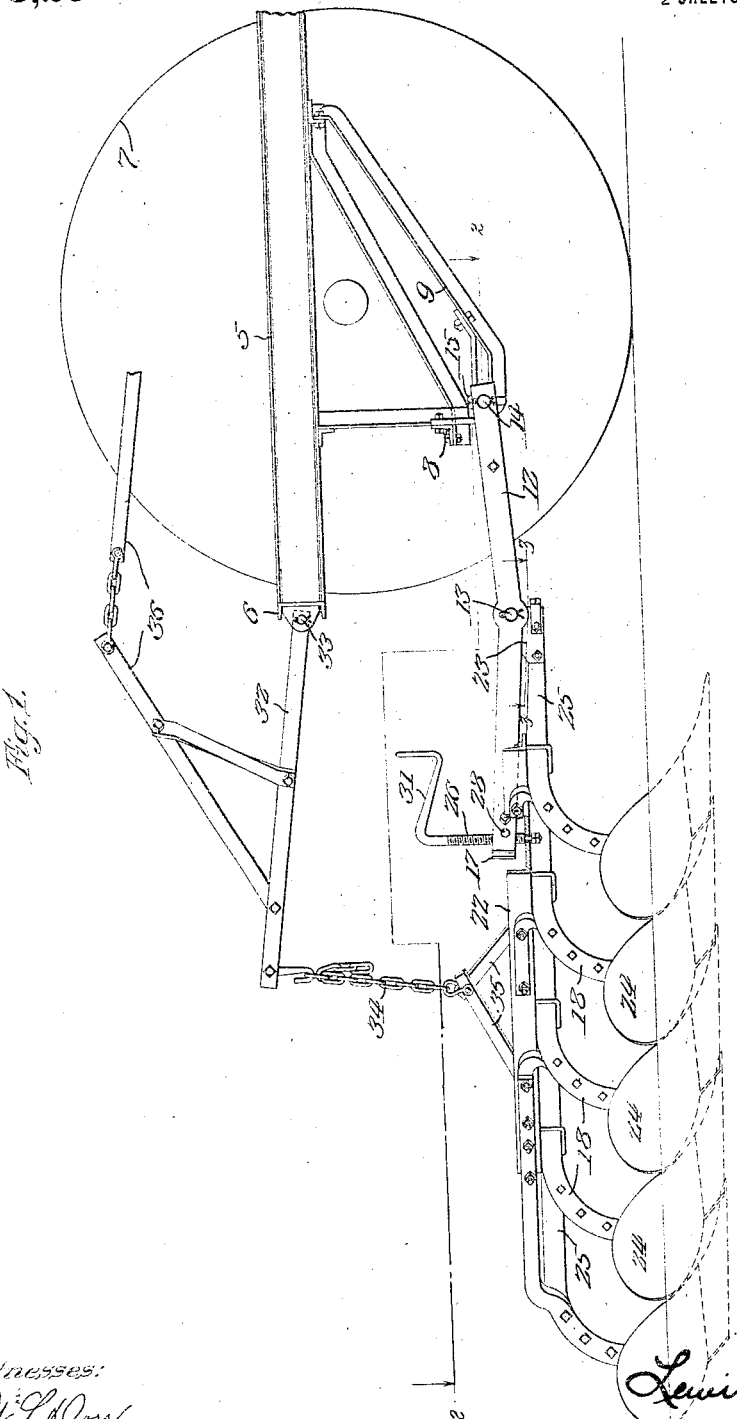

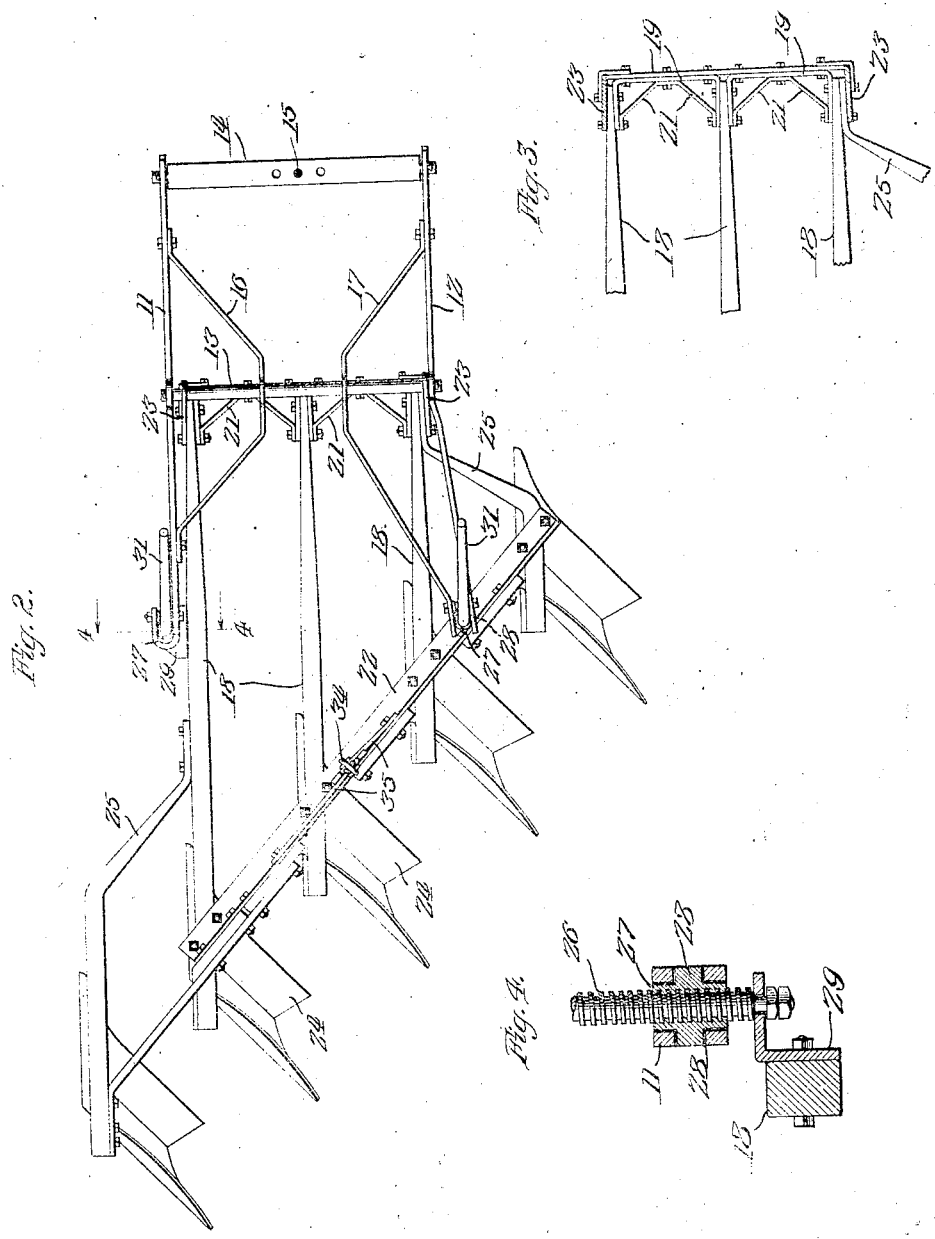

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

GANG-PLOW FRAME.

1,198,298.  Specification of Letters Patent.  Patented Sept. 12, 1916.

Application filed May 25, 1914. Serial No. 340,880.

*To all whom it may concern:*

Be it known that I, LEWIS E. WATERMAN, a citizen of the United States, residing at Rockford, in the county of Winnebago and State of Illinois, have invented certain new and useful Improvements in Gang-Plow Frames, of which the following is a specification.

This invention relates in general to plows, and more particularly to plows which are adapted to be hitched directly to a traction engine and to be raised and lowered by power means carried by the engine.

One of the primary objects of my invention is to provide a novel means by which the working depth of plows may be adjusted.

A further object is to provide a gang plow frame adapted to be hitched to a traction engine or any power-drawn means, to be swung vertically and bodily from its tractor hitch to raise and lower the plows, with means for angling the plows vertically relatively to the said frame for the purpose of varying the working depth of the plows.

Another object of my invention is to provide a gang plow frame of the above mentioned character, with means whereby the working depth of the plows may be readily and easily adjusted.

A further object is to provide an improved construction of gang plow frame, primarily with the view of securing simplicity and lightness of structure, and the capability of being easily moved to various positions, both operative and inoperative.

Referring to the drawings: Figure 1 is a side elevational view of a gang of moldboard plows hitched to the rear end of a traction engine, showing my improvements. Fig. 2 is a plan view taken on the line 2—2 of Fig. 1. Fig. 3 is a fragmentary plan view taken on the line 3—3 of Fig. 1; and Fig. 4 is an enlarged vertical sectional view taken on the line 4—4 of Fig. 2.

The use of a gang of plows associated to form a unit whereby they may be connected to a traction engine or other power-drawn means and raised and lowered bodily as a unit, is desirable, because of the many and well known attendant advantages of this type of gang plow. When mold-board plows are connected to draft means of the above described character whereby the draft is from a point fixed relatively to the ground, and are drawn along the ground, the plows will seek a certain working depth wherein the bottoms of the plows are in a horizontal plane. By changing the height of the point of draft from the ground or by angling the bottoms of the plows relatively to said point of draft, the plows will assume a different working position, to turn either a deeper or shallower furrow according to the level they must seek to follow a horizontal plane. I have embodied this feature in my improvements in a manner which will be hereinafter described.

The gang plow is attached directly to a traction engine frame in such a manner that it can be swung bodily to raised and lowered positions by power-operated means carried by the tractor. The power-operated means for raising the gang plow I have not illustrated in the drawings, because various types of such means may be used, and because they form no part of the subject matter of my present invention.

In the drawings I have illustrated the rear end of a traction engine diagrammatically, having shown a longitudinal frame side-beam 5, a transverse end-beam 6, and a drive-wheel 7. The side-beams 5 carry an underhung draft frame including a transverse angle-bar 9, this draft frame being located in proximity of, but below, the drive-wheel axle.

The plows are of the mold-board type and are connected as a unit to a plow frame which is pivotally connected with the underhung draft frame in such a manner that it may be swung vertically, being fulcrumed from said draft frame to raise and lower the plows. For the purpose of permitting adjustment of the plows to different working depths I have constructed the plow frame in two relatively vertically movable sections, namely, a forward and a rear section, the former being pivotally attached to the draft frame, and the latter being equipped with a plurality of plows and being attached to the forward section in such a manner that in plowing, the rear section will be maintained relatively rigid with the forward section, but when desired it may be adjusted vertically relatively to said forward section for the purpose of changing the angular relation of the plow bottoms with the draft connection of the forward section.

The forward section comprises a pair of longitudinally extending side bars 11 and 12 which are connected by cross-bars 13 and 14, the former cross-bar being located intermediately of the ends of the side bars and forming a pivot support to which the rear frame section may be pivotally attached, and the latter cross-bar being rotatably mounted in connection with said side bars at the forward ends of the same and being connected centrally between said side bars by a vertical king-bolt 15 with the draft bar 9. This mounting of the forward section permits it to be swung laterally from the king-bolt 15 as a center of oscillation, and vertically from the cross-bar 14 as an axis of oscillation. The side bars are braced to the cross-bar 13 by brace bars 16 and 17.

The rear section or plow frame proper is constructed of a plurality of spaced longitudinally extending plow-beams 18 rigidly connected at their forward ends by cross-bars 19 and braced by bars 21, and a diagonally arranged angle-beam 22 fixedly connected to the rear end of said beams. This frame is interposed between the side bars 11 and 12 and is pivotally connected to the forward section through the upstanding brackets 23 fixedly connected to the forward end of the rear section and pivotally mounted upon the cross-bar 13. The plow-beams are equipped with mold-board plows 24, and an additional number of plows may be added to the outer plow-beams 18 by extending said plow-beams 25 outwardly and rearwardly to position their rear plow-equipped ends in proper relation to the plows 24. From the above it will be seen that the plows may be swung vertically as a unit, being fulcrumed from the cross-bar 13 of the forward section.

The rear ends of the side bars 11 and 12 are adjustably connected with the rear section in such a manner that the forward and rear sections are maintained rigid relatively, but the rear section may be adjusted upon its pivot, relatively to the forward section. These functions are attained by mounting a screw-rod 26 in a nut-member 27 trunnioned at 28 upon the rear end of each side bar portion of the forward section, and swivelingly connecting the lower ends of the rod 26 with the rear section, in one instance to the angle-beam 22 as shown in Fig. 1, and in the other instance to a bracket 29 attached to an outer beam 18, as shown in Fig. 4. Each screw-rod is provided with a crank-handle 31, which when rotated will move the plows of the rear section either up or down relatively to their pivotal connection with the forward section. It will be manifest that with the plows resting upon the ground, there is required but little force to turn the cranks 31, because of the arrangement of the several pivotal points of the frame sections.

The power-operated means above mentioned, for raising the plows, may be connected to the plow frame in any suitable manner, and suitable means may be connected thereto and to the plow frame for raising and lowering the plows, the latter means herein employed being that of a lever or raising-boom 32 pivotally mounted at 33, on the rear end of the tractor and connected to the plow frame by an adjustable chain 34, and bars 35 connected to the angle-beam 22. The lever or boom is swung upon its pivot by the action of said power means, through the agency of the intermediate lever members 36.

The plows are shown in Fig. 1 in a lowered working position, wherein the depth of the furrows is determined by the relative position of the plow-bottoms with the point of draft. The draft being from the cross-bar 14 which is held at a position fixed relatively to the ground, the plows will assume a working depth as shown, with their bottoms in a horizontal plane. It will be manifest that by turning the cranks 31 the plows may be raised or lowered relatively to the forward section by swinging of the rear section vertically upon its fulcrum 13, and that this movement of the plows changes the vertical relation of their bottoms with the point of draft, thereby causing the plows to turn a shallower or deeper furrow, depending upon said adjustment by the cranks.

It will be noticed that the above described plow-carrying frame and the arrangement of the plows gives a very simple gang plow structure, one which is of light weight to facilitate moving to its several positions, and one which is capable of various desired movements.

While I have shown and described a preferred embodiment of the invention, I do not desire to limit myself to the specific embodiment shown, since various changes in structural details may be resorted to without departing from the spirit of the invention or sacrificing any of its material advantages.

I claim as my invention:

1. The combination of a tractor provided with an underhung draft frame, a rigid frame pivotally connected to said draft frame and extending rearwardly therefrom, an implement frame, pivotally connected at its forward end to said rigid frame intermediate its ends so that the rear end of the rigid frame overlies the implement frame, manually adjustable means between the overhung portion of said rigid frame and said implement frame whereby the relative positions of said frames may be adjusted, and means carried by said tractor frame for lifting said frames bodily about the pivotal connection between said rigid frame and said underhung frame as a pivot.

2. The combination of a tractor provided with an underhung draft frame, a rigid frame pivotally connected thereto, an implement frame pivotally connected to said rigid frame so that portions of said frames overlap each other, a plurality of earth-working implements carried by said implement frame, a plurality of adjustable screw connections between the overlapping portions of said rigid frame and said implement frame whereby the relative position of said frames may be adjusted, and means carried by said tractor for lifting said frames as a unit.

LEWIS E. WATERMAN.

Witnesses:
W. R. BAXTER,
JOHN A. GARVER.